United States Patent [19]  [11] 4,391,562
Hetzner  [45] Jul. 5, 1983

[54] ADJUSTABLE TRAILER DRAWBAR

[76] Inventor: Randall H. Hetzner, 6750 Holland Rd., Saginaw, Mich. 48601

[21] Appl. No.: 261,734

[22] Filed: May 7, 1981

[51] Int. Cl.³ .......................... B60P 1/28; B60D 1/14
[52] U.S. Cl. ................................ 414/483; 280/490 R;
  298/17
[58] Field of Search ............................ 414/482–485;
  298/17 R; 280/490 R, 491 R

[56] References Cited
U.S. PATENT DOCUMENTS 2,327,308  8/1943  Johnston .................... 280/490 R X
2,505,421  4/1950  McMurtrie .................... 280/490 R Primary Examiner—Robert G. Sheridan
Attorney, Agent, or Firm—Learman & McCulloch

[57] ABSTRACT

A wheeled trailer has a frame adapted to be coupled by a drawbar to a towing vehicle. The drawbar has a rear end capable of attachment at any one of a number of vertically spaced points to an anchor member and has an intermediate portion removably retained in an open bottom socket within which is a fulcrum. Vertical adjustment of the rear end of the drawbar effects vertical adjustment of its forward end in a manner to compensate for varying height trailer hitches on different vehicles and enable the trailer bed to occupy a substantially horizontal position. The trailer frame is capable of rocking movement about the axes of its wheels to a position in which the rear end of the trailer bears against the ground.

8 Claims, 5 Drawing Figures

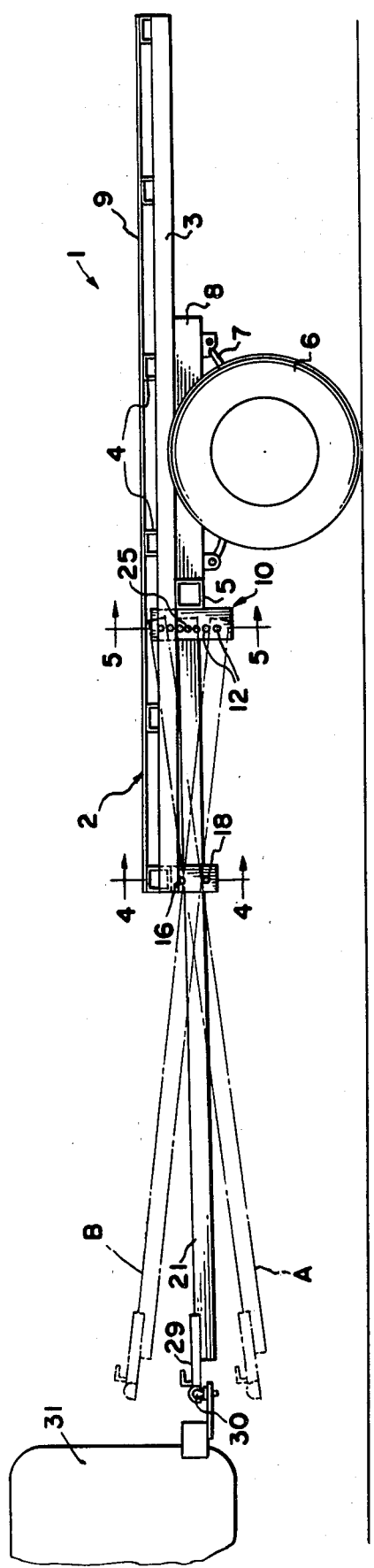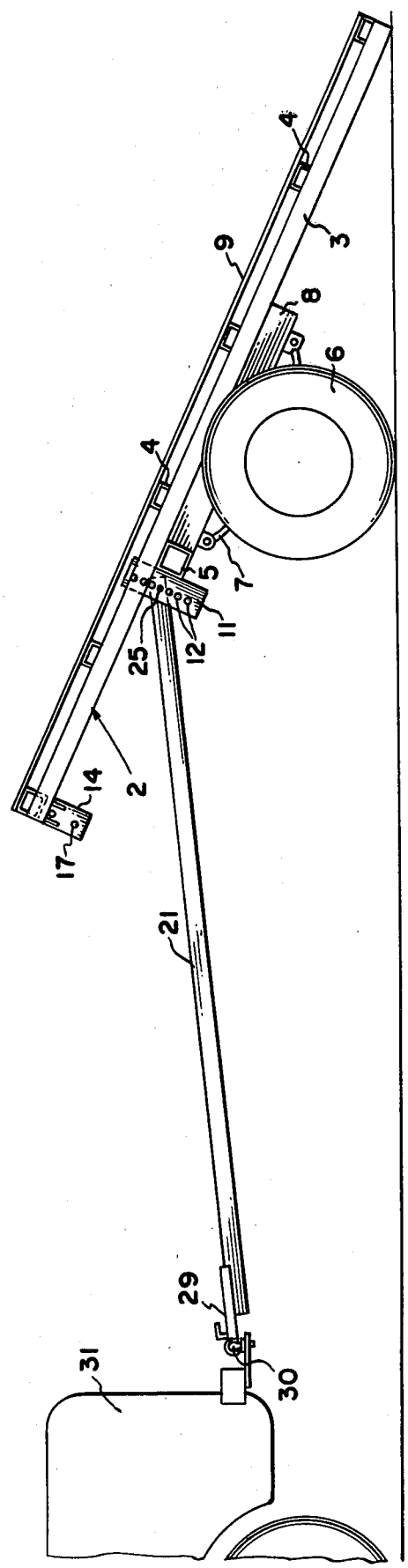

ADJUSTABLE TRAILER DRAWBAR

BACKGROUND OF THE INVENTION

Trailers adapted to be towed behind a vehicle conventionally include a frame on which is mounted ground engaging wheels and a trailer bed, the frame also supporting a forwardly projecting drawbar fitted with a hitch by means of which the drawbar may be coupled to a towing vehicle. There apparently is no standard height that trailer drawbars occupy above ground level, nor does there appear to be any standard height above ground level that a trailer hitch may be mounted on a towing vehicle. On the contrary, it appears that trailer hitches and drawbars are constructed and assembled with little or no regard for standardization. As a consequence, it is not uncommon for the beds of some trailers, when coupled to a towing vehicle, to be forwardly and downwardly inclined or forwardly and upwardly inclined depending upon whether the vehicle mounted trailer hitch is relatively low or relatively high above ground level. Such non-horizontal positions of a trailer bed are undesirable since articles supported on a downwardly pitched trailer bed will tend to move forwardly when the trailer is decelerated and at a rate greater than would be the case if the trailer bed were horizontal. In addition, the vertical motion to which the trailer is subjected because of unevenness in road surfaces causes the contents of a forwardly pitched trailer bed also to move forwardly.

The same objections occur with respect to a rearwardly pitched trailer frame bed, with the exception that the contents of the bed tend to move rearwardly in response to acceleration of the trailer and as a result of vertical vibrations due to road surface unevenness.

The disadvantages of towing a trailer with its bed in any position other than substantially horizontal has been recognized in the past and numerous proposals have been made for enabling the drawbar of a trailer to be adjusted so as to compensate for differences in the height at which a hitch member is mounted on a towing vehicle. Typical of the previous proposals are those disclosed in U.S. Pat. Nos. 1,190,237; 2,228,699; 2,277,900; 2,327,308; and 3,830,522. Although these previous proposals will accomplish the desired objective, they are rather cumbersome, expensive, and employ an undesirably large number of different parts. Further, none of them enables the trailer bed with which it is associated to be tilted rearwardly so that its rear end rests upon the ground to facilitate the loading or unloading of an article, such as a mobile snowmobile, on or off the trailer bed while the drawbar remains coupled to the towing vehicle.

Among the objects of the present invention is the provision of a trailer and drawbar assembly which enables a trailer bed to be maintained in a substantially horizontal position when coupled to any one of a large number of different vehicles and which enables the trailer bed to be tilted to facilitate loading and unloading of the trailer without necessitating uncoupling of the drawbar from the towing vehicle.

SUMMARY OF THE INVENTION

A trailer has a frame on which are mounted a pair of ground engaging wheels and a trailer bed. Also mounted on the frame between its forward and rearward ends is a channel-shaped anchor member having a plurality of vertically spaced openings therein for the removable accommodation of an anchor pin. Adjacent the forward end of the trailer frame is a channel-shaped socket member having a downwardly facing open side. A rounded fulcrum is fixed to the socket at its upper end and the sides of the socket have aligned openings therein for the removable accommodation of a retaining pin.

An elongate drawbar is adapted to be secured to the anchor member and accommodated within the socket member. The drawbar has an opening at its rear end for the removable reception of the anchor pin, thereby enabling the rear end of the drawbar pivotally to be secured to the anchor member. An intermediate portion of the drawbar bears against the fulcrum within the socket member and is retained in the latter by the retaining pin. The forward end of the drawbar is fitted with a hitch member by means of which the drawbar may be coupled to a companion hitch member secured to a towing vehicle.

By adjusting the position of the anchor pin vertically relative to the anchor member the trailer bed may be maintained in a substantially horizontal position even though the vehicle mounted hitch component is at any one of a number of different vertical positions.

By removing the retaining pin from the socket member, the trailer bed may be pivoted about the axes of the ground engaging wheels in order to permit the rear end of the trailer frame to rest upon the ground, thereby facilitating loading and unloading of the trailer from the rear end of the latter.

DESCRIPTION OF THE DRAWINGS

The foregoing and other advantages of the invention will become apparent from the following description when it is considered in conjunction with the appended claims and the accompanying drawings, in which:

FIG. 1 is a side elevational view of a trailer constructed in accordance with the invention and illustrating the trailer coupled to a towing vehicle;

FIG. 2 is a view similar to FIG. 1, but illustrating the trailer in the rearwardly tilted position;

DETAILED DESCRIPTION

Figure 3:
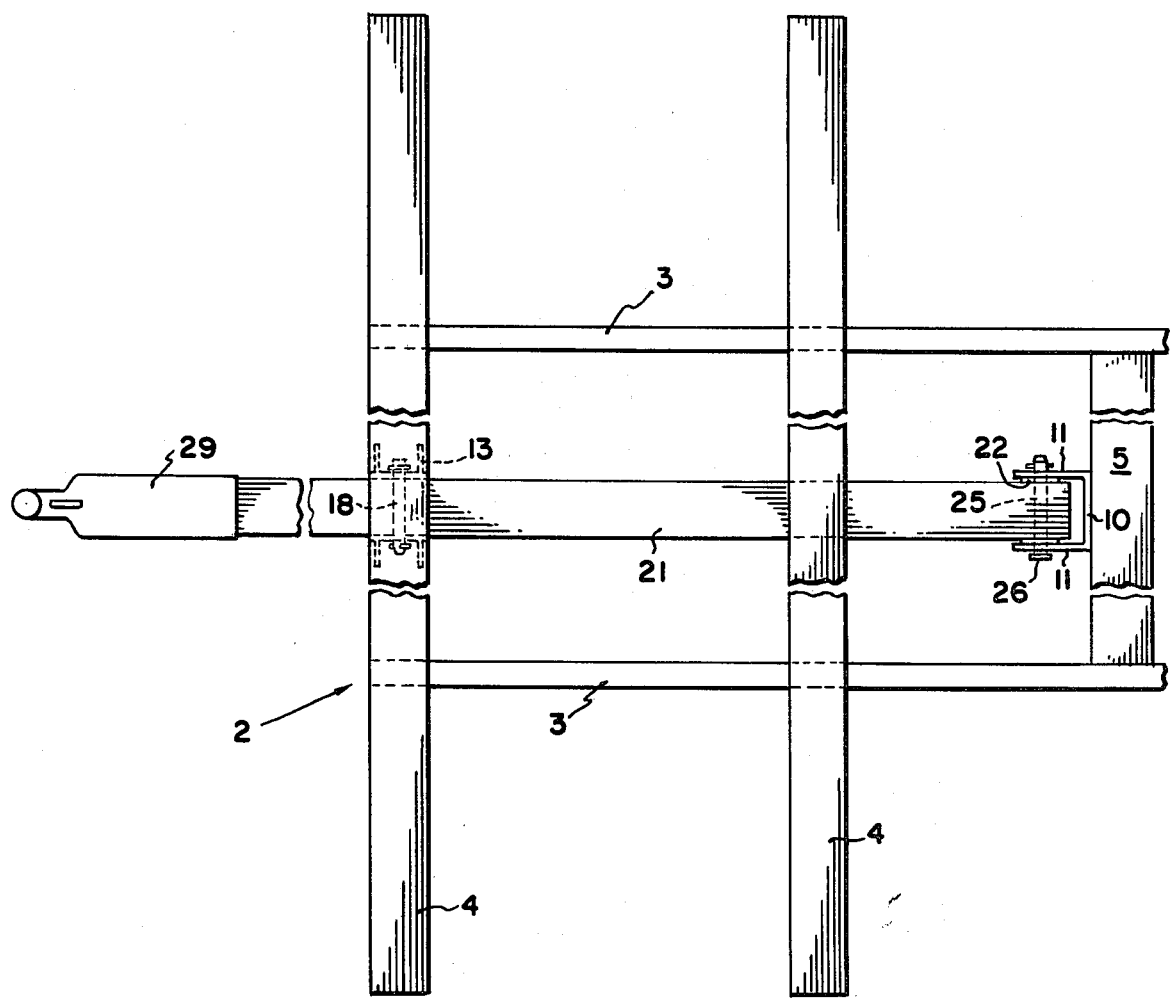
FIG. 3 is a fragmentary, top plan view of a portion of the trailer frame, with the trailer bed omitted for purposes of clarity.
Figure 4:
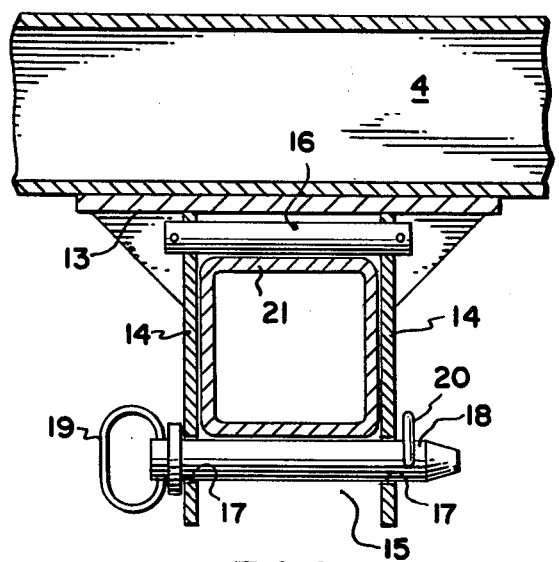
FIGS. 4 and 5 are enlarged sectional views taken on the lines 4—4 and 5—5, respectively of FIG. 1.
Figure 5:
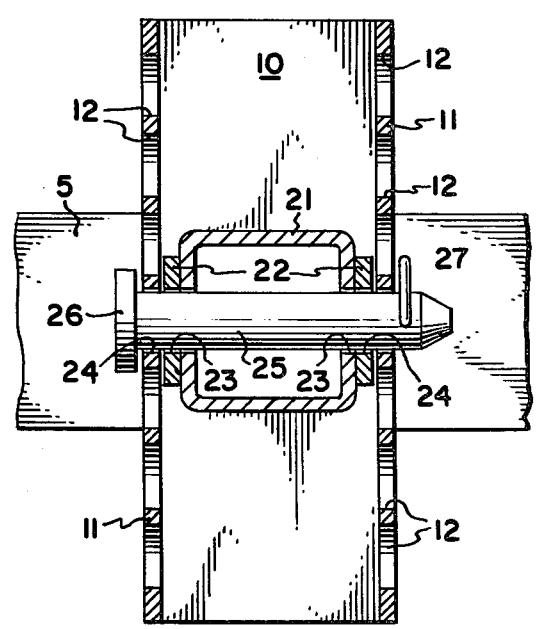

A trailer constructed in accordance with the invention is designated generally by the reference character 1 and comprises a frame 2 having a number of longitudinally extending frame members 3 on which are fixed cross bars 4 of preferably channel configuration. The frame also includes a cross member 5 spanning the members 3 and of box configuration.

Ground engaging wheels 6 and a spring suspension system 7 of known construction are mounted on the frame 2 adjacent opposite sides of the latter and substantially midway between the ends of the frame. The wheel mounting means includes frame members 8 which depend below the level of the longitudinal members 3. Also mounted on the frame 2 is a flat trailer bed 9 that is supported on and secured to the cross members 4.

Welded or otherwise suitably fixed to the cross member 5 is a channel-shaped anchor member 10 having a pair of spaced apart sides 11, each of which is provided with a plurality of vertically spaced openings 12 forming attaching points for a purpose presently to be explained.

Adjacent the forward end of the frame 2 is welded or otherwise suitably secured a channel-shaped socket member 13 having a pair of spaced apart side walls 14 and a downwardly facing open side 15. At the upper end of the socket is a cylindrical pin 16 which spans the two side walls 14 and forms a rounded fulcrum for a purpose to be explained. Adjacent the open side 15 of the socket the walls 14 are provided with openings 17 for the removable accommodation of a retaining pin 18 having a handle 19 at one end and a cotter pin 20 or the like at the opposite end.

Associated with the trailer is an elongate drawbar 21 of box-like configuration provided at its rearward end with a pair of bearing plates 22 flanking the drawbar. The drawbar and the bearing plates are provided with openings 23 and 24, respectively, for the removable accommodation of an anchor pin 25 having a head 26 at one end and a cotter pin 27 or the like at its other end. The pin 25 is of such length as to project beyond both ends of the sides 11 of the anchor member 10.

The drawbar 21 is capable of fitting snugly, but slidably, between the side walls 14 of the socket member 13 to bear against the fulcrum pin 16. The drawbar 21 removably may be retained in the socket member 13 by retaining pin 18.

At the forward end of the drawbar 21 is mounted a hitch unit 29 of conventional construction and which is adapted to cooperate with a companion hitch 30 mounted on a towing vehicle 31.

To condition the apparatus for operation, the rear end of the drawbar 21 is fitted within the anchor member 10 and the anchor pin 25 is extended through aligned openings 12, 23, and 24. The drawbar 21 also is fitted into the socket member 13 and the retainer pin 18 is passed through the openings 17 to retain the drawbar within the socket member. The hitch member 29 then is coupled to the hitch member 30 of the vehicle 31 so as to enable the trailer to be towed behind the vehicle.

If the hitch unit 30 is at about the same vertical level as the central attaching point of the anchor member 11, the drawbar 21 will occupy a substantially horizontal position and the trailer bed 9 also will occupy a substantially horizontal position. If the hitch unit 30 is at a lower level, however, as is indicated by the lower chain line position A of the drawbar 21 in FIG. 1, the trailer bed 9 still may be maintained in a horizontal position by removing the anchor pin 25, adjusting the rear end of the drawbar 21 upwardly relatively to the anchor member 10, and reinserting the anchor pin 25 through the anchor member 10 and the drawbar 21 at a higher attachment point. In this position of the drawbar 21, the latter will be forwardly and downwardly inclined, but the trailer bed 9 will be in a substantially horizontal position.

If the hitch unit 30 is at a higher level than that shown in full lines in FIG. 1, as is indicated by the chain line position B of the drawbar, the rear end of the drawbar should be relocated in the anchor member 10 at a lower attachment point, thereby enabling the trailer bed 9 to assume the substantially horizontal position even though the drawbar itself will be inclined upwardly in the forward direction.

The curvature of the fulcrum pin 16, coupled with the spacing between the pin 16 and the retainer pin 18, ensures the ability of the drawbar 21 to rotate about the fulcrum through the full limit of the height of the anchor member 10.

In all positions of the drawbar relative to the anchor member 10 the retainer pin 18 may be withdrawn from the socket member 13 whereupon the trailer frame and the bed 9 may be rocked from the position shown in FIG. 1 to the position shown in FIG. 2 in which the rear end of the trailer frame bears against the ground, thereby facilitating the loading and unloading of the trailer from the rear. Following loading or unloading operations, the frame may be swung toward the position shown in FIG. 1 and retained in such position by the retainer pin 18.

The disclosed embodiment is representative of a presently preferred form of the invention, but is intended to be illustrative rather than definitive thereof. The invention is defined in the claims.

I claim:

1. In a trailer having a frame, ground engaging wheels, means mounting said wheels on said frame, a trailer bed, and a drawbar for coupling said frame to a towing vehicle, the improvement comprising an anchor member fixed to said frame between its forward and rearward ends, said anchor member having a number of vertically spaced attachment points; means forming a fulcrum adjacent the forward end of said frame and on which said drawbar bears, said fulcrum being located at a level between those of the uppermost and lowermost of said attachment points thereby enabling said drawbar to rock about said fulcrum to a selected position in which its rearward end is at a level above, below, or corresponding to the level of said fulcrum; hitch means at the forward end of said drawbar for coupling the latter to said towing vehicle; and anchor means separably connecting said drawbar at its rearward end to said anchor member at a selected one of said attachment points, said one of said attachment points being so selected that said trailer bed is substantially horizontal when said drawbar is coupled to said towing vehicle.

2. Apparatus according to claim 1 including retainer means carried by said fulcrum forming means, said drawbar normally being accommodated between said fulcrum and said retainer means.

3. Apparatus according to claim 2 wherein said retainer means is separable from said fulcrum forming means to enable said trailer frame to rock relatively to said drawbar.

4. Apparatus according to claim 1 wherein each of said attachment points comprises an opening and said anchor means comprises a pin removably accommodated in a selected opening.

5. A drawbar and attachment assembly for a trailer having a frame, wheels mounted on said frame, and a trailer bed mounted on said frame, said assembly comprising an anchor member mounted on said frame between its forward and rearward ends and at a level below that of said bed, said anchor member having a plurality of vertically spaced attachment points; a socket member fixed to said frame adjacent its forward end for the accommodation of said drawbar and forming a fulcrum about which said drawbar may rock to a selected position in which its rearward end is at a level above, below, or corresponding to that of said fulcrum, said socket member having a downwardly open side through which said drawbar freely may pass into and out of said socket member; removable retaining means carried by said socket member for preventing the passage of said drawbar out of said socket member; means for coupling said drawbar at its forward end to a towing vehicle; and anchor means pivotally securing said drawbar at its rearward end to said anchor member and at one of said attachment points to enable said trailer bed to occupy a substantially horizontal position.

6. An assembly according to claim 5 wherein said anchor member comprises a forwardly open channel having opposite sides provided with aligned openings.

7. An assembly according to claim 6 wherein said anchor means comprises a pin extending through selected openings in said sides and through an opening found in said drawbar adjacent its rear end.

8. An assembly according to claim 5 wherein said drawbar is a unitary member rigid from end to end.

* * * * *